United States Patent
Boyland et al.

(10) Patent No.: US 11,161,258 B2
(45) Date of Patent: Nov. 2, 2021

(54) ROBOT ARM JOINT

(71) Applicant: KOLLMORGEN CORPORATION, Radford, VA (US)

(72) Inventors: John Boyland, Christiansburg, VA (US); Brian Scott Dawson, Dublin, VA (US); Shelly Dunkleman, Christiansburg, VA (US); Wei Tong, Radford, VA (US); Bradley A. Trago, Blacksburg, VA (US); Brandon L. Winesett, Fairlawn, VA (US)

(73) Assignee: KOLLMORGEN CORPORATION, Radford, VA (US)

( * ) Notice: Subject to any disclaimer, the term of this patent is extended or adjusted under 35 U.S.C. 154(b) by 322 days.

(21) Appl. No.: 15/819,174

(22) Filed: Nov. 21, 2017

(65) Prior Publication Data
US 2018/0200896 A1    Jul. 19, 2018

Related U.S. Application Data

(60) Provisional application No. 62/446,616, filed on Jan. 16, 2017.

(51) Int. Cl.
*B25J 19/00* (2006.01)
*F16D 65/12* (2006.01)
(Continued)

(52) U.S. Cl.
CPC .......... *B25J 19/0054* (2013.01); *B25J 13/08* (2013.01); *B25J 19/0004* (2013.01);
(Continued)

(58) Field of Classification Search
CPC .... B25J 19/0054; B25J 13/08; B25J 19/0004; H02K 7/102; H02K 9/06; H02K 7/116;
(Continued)

(56) References Cited

U.S. PATENT DOCUMENTS

| 4,577,127 | A | * | 3/1986 | Ferree | B25J 9/1025 |
|---|---|---|---|---|---|
| | | | | | 310/112 |
| 4,843,269 | A | * | 6/1989 | Shramo | H02K 21/14 |
| | | | | | 310/104 |

(Continued)

FOREIGN PATENT DOCUMENTS

| CN | 107398924 A | 11/2017 |
|---|---|---|
| GB | 387837 A | 2/1933 |

(Continued)

OTHER PUBLICATIONS

European Search Report and Written Opinion, issued in corresponding patent application No. EP 18150760.9, dated May 7, 2018.
(Continued)

*Primary Examiner* — Victor L MacArthur
(74) *Attorney, Agent, or Firm* — Day Pitney LLP; Valeriya Svystun

(57) ABSTRACT

A mechanical joint configured for providing dissipation of heat generated is provided. The mechanical joint includes a housing containing a motor assembly configured to drive a gear assembly for driving the mechanical joint, the motor assembly configured to be controlled by a control assembly for controlling rotation of a rotor of the motor assembly; wherein a brake disk of the control assembly is configured to increase air flow within the housing. A robot and a robotic system are also disclosed.

17 Claims, 11 Drawing Sheets

(51) Int. Cl.
*F16D 65/847* (2006.01)
*F16D 66/00* (2006.01)
*B25J 13/08* (2006.01)
*H02K 7/102* (2006.01)
*H02K 9/06* (2006.01)
*H02K 7/116* (2006.01)
*F16D 65/02* (2006.01)

(52) U.S. Cl.
CPC ......... *F16D 65/128* (2013.01); *F16D 65/847* (2013.01); *F16D 66/00* (2013.01); *H02K 7/102* (2013.01); *H02K 7/116* (2013.01); *H02K 9/06* (2013.01); *F16D 2065/1328* (2013.01); *F16D 2065/1332* (2013.01); *Y10S 901/46* (2013.01)

(58) Field of Classification Search
CPC ...... F16D 65/128; F16D 65/847; F16D 66/00; F16D 2065/1328; F16D 2065/1332; Y10S 901/46
See application file for complete search history.

(56) References Cited

U.S. PATENT DOCUMENTS

| | | | |
|---|---|---|---|
| 5,806,169 A * | 9/1998 | Trago | H02K 5/08 29/596 |
| 5,959,384 A * | 9/1999 | Mosciatti | H02K 5/225 310/92 |
| 6,020,661 A * | 2/2000 | Trago | H02K 5/08 310/43 |
| 6,170,615 B1 | 1/2001 | Cheng | |
| 6,250,433 B1 | 6/2001 | Sealine et al. | |
| 6,422,814 B1 * | 7/2002 | Dickey | F04D 25/0613 415/123 |
| 6,435,320 B1 | 8/2002 | Drennen et al. | |
| 7,306,426 B2 * | 12/2007 | Franz | F04D 27/008 415/123 |
| 8,310,126 B1 * | 11/2012 | Hopkins | H02K 1/148 310/156.19 |
| 8,410,732 B2 | 4/2013 | Kassow et al. | |
| 8,473,103 B2 | 6/2013 | Tsai et al. | |
| 8,614,559 B2 | 12/2013 | Kassow et al. | |
| 8,624,453 B2 * | 1/2014 | Yoshidomi | H02K 11/22 310/68 B |
| 8,814,504 B2 * | 8/2014 | Langgood | F04D 25/0613 415/123 |
| 9,188,130 B2 * | 11/2015 | Johnson | F04D 27/008 |
| 2005/0186071 A1 * | 8/2005 | Franz | F04D 27/008 415/220 |
| 2008/0315728 A1 * | 12/2008 | Liu | F16H 25/2454 310/60 R |
| 2014/0193248 A1 * | 7/2014 | Johnson | F04D 27/008 415/191 |
| 2018/0073514 A1 * | 3/2018 | Zhang | F04D 25/166 |

FOREIGN PATENT DOCUMENTS

| | | | |
|---|---|---|---|
| GB | 1440334 A | 6/1976 | |
| JP | 63-214530 A | 9/1988 | |
| JP | 2002-354750 A | 12/2002 | |
| JP | 2002354750 A | 12/2002 | |
| JP | 2011-58578 A | 3/2011 | |
| KR | 10-1425882 B1 | 8/2014 | |
| KR | 10-1425882 B1 | 8/2014 | |
| WO | WO-2017148499 A1 * | 9/2017 | F16D 63/006 |

OTHER PUBLICATIONS

Third party observations regarding corresponding European patent application No. 18150760.9 with copies of references, dated Oct. 30, 2020 (119 pages).

* cited by examiner

-- PRIOR ART --

ROBOT ARM JOINT

CROSS REFERENCE TO RELATED APPLICATIONS

This application is filed under 35 U.S.C. § 111(a) and further, under 35 U.S.C. § 119(e) claims the benefit of U.S. provisional patent application Ser. No. 62/446,616, filed Jan. 16, 2017 and entitled "Robot Arm Joint," the entire disclosure of which is incorporated herein by reference for any purpose whatsoever.

FIELD

The present invention relates generally to industrial robots and, more particularly, to an articulating joint for use in a robot arm.

BACKGROUND

Robots have been used in industrial applications for over sixty years. Early implementations of robots involved simple devices that, for example, transferred objects from a first point to a second point several feet away. Presently, robots are used in many facets of manufacturing across a wide variety of industries, with automotive companies leading the way by automating significant portions of their assembly lines. Typically, robots that are commonly used today include large devices that operate at high speeds and are located in areas mostly isolated from humans to prevent physical injury.

Over the last several years robots have become advanced enough and are small enough to work safely alongside humans. They have been designed such that the possibility of injury to a person who may come into contact with a robot has mostly been eliminated. A very common use of these "human safe" robots is for pick-and-place applications. In pick-and-place and other similar implementations, articulating robot arms provide a cost-effective solution. Articulating robot arms have several rotary joints, thereby providing a very broad range of motion. Unfortunately, as these robots have become smaller, the joints have become more complex. As a result, the robots suffer reliability issues stemming from mechanical, thermal, electrical and other possible failure modes for the articulating joint.

Thus, what are needed are improved joint mechanisms for use in robots that include an articulating joint.

SUMMARY

In one embodiment, a mechanical joint configured for providing dissipation of heat generated is provided. The mechanical joint includes a housing containing a motor assembly configured to drive a gear assembly for driving the mechanical joint, the motor assembly configured to be controlled by a control assembly for controlling the rotation of a rotor of the motor assembly; wherein a brake disk of the control assembly is configured to increase air flow within the housing.

The brake disk may include at least one of fins, dents, bumps and punched slots. The brake disk may be combined with an encoder disk configured for monitoring rotation; and a distance between a magnetic read head and the encoder disk may be adjustable. At least one of a solenoid of the control assembly and a stator of the motor assembly may be potted with material selected to conduct heat away therefrom. A solenoid of the control assembly may be mounted within a pocket of the housing. A solenoid of the control assembly may be proximate to a thruway of the housing. At least one of a rear cover, mid-cover, the brake disk, at least a portion of the gear assembly and the housing may be fabricated from aluminum or an alloy thereof. The control assembly may include a plunger pin configured to engage at least one of a punched slot, a dent and a bump of the brake disk. The mechanical joint may further include at least one sensor configured for monitoring a performance parameter disposed therein and the performance parameter may include at least one of temperature, stress, strain, load, position, rotation, and acceleration.

In another embodiment, a robot is provided. The robot includes: at least one mechanical joint configured for providing dissipation of heat generated therein, and including a housing containing a motor assembly configured to drive a gear assembly for driving the mechanical joint, the motor assembly configured to be controlled by a control assembly for controlling rotation of a rotor of the motor assembly; wherein a brake disk of the control assembly is configured to increase air flow within the housing; and a tool configured for performing a task.

The robot may be a 6-axis robot. The task may include at least one of grasping, lifting, locating, placing of goods, painting, welding, soldering, disassembly, assembly, picking, planting, pruning, cutting, and harvesting.

In a further embodiment, a robotic system is provided. The robotic system includes: a robot including at least one mechanical joint configured for providing dissipation of heat generated therein, and including a housing containing a motor assembly configured to drive a gear assembly for driving the mechanical joint, the motor assembly configured to be controlled by a control assembly for controlling rotation of a rotor of the motor assembly; wherein a brake disk of the control assembly is configured to increase air flow within the housing; and a tool configured for performing a task; and a controller for controlling the robot.

The controller may include machine readable instructions stored on non-transitory media and that are machine executable, the instructions for controlling the robot to perform the task.

The controller may include machine readable instructions stored on non-transitory media and that are machine executable, the instructions for controlling the robot to control at least one of the motor assembly and the control assembly. The controlling may result from data received from sensors within the mechanical joint. The sensors may include sensors configured for monitoring at least one of temperature, stress, strain, load, position, rotation, and acceleration.

BRIEF DESCRIPTION OF THE DRAWINGS

The features and advantages of the invention are apparent from the following description taken in conjunction with the accompanying drawings in which.

DETAILED DESCRIPTION

Disclosed herein are methods and apparatus that provide for a mechanical joint. The mechanical joint is suited for use in a robotic system, in particular as an articulating joint for a robotic arm. A non-limiting example of a robotic system 10 is shown schematically in FIG. 1.

Figure 1:
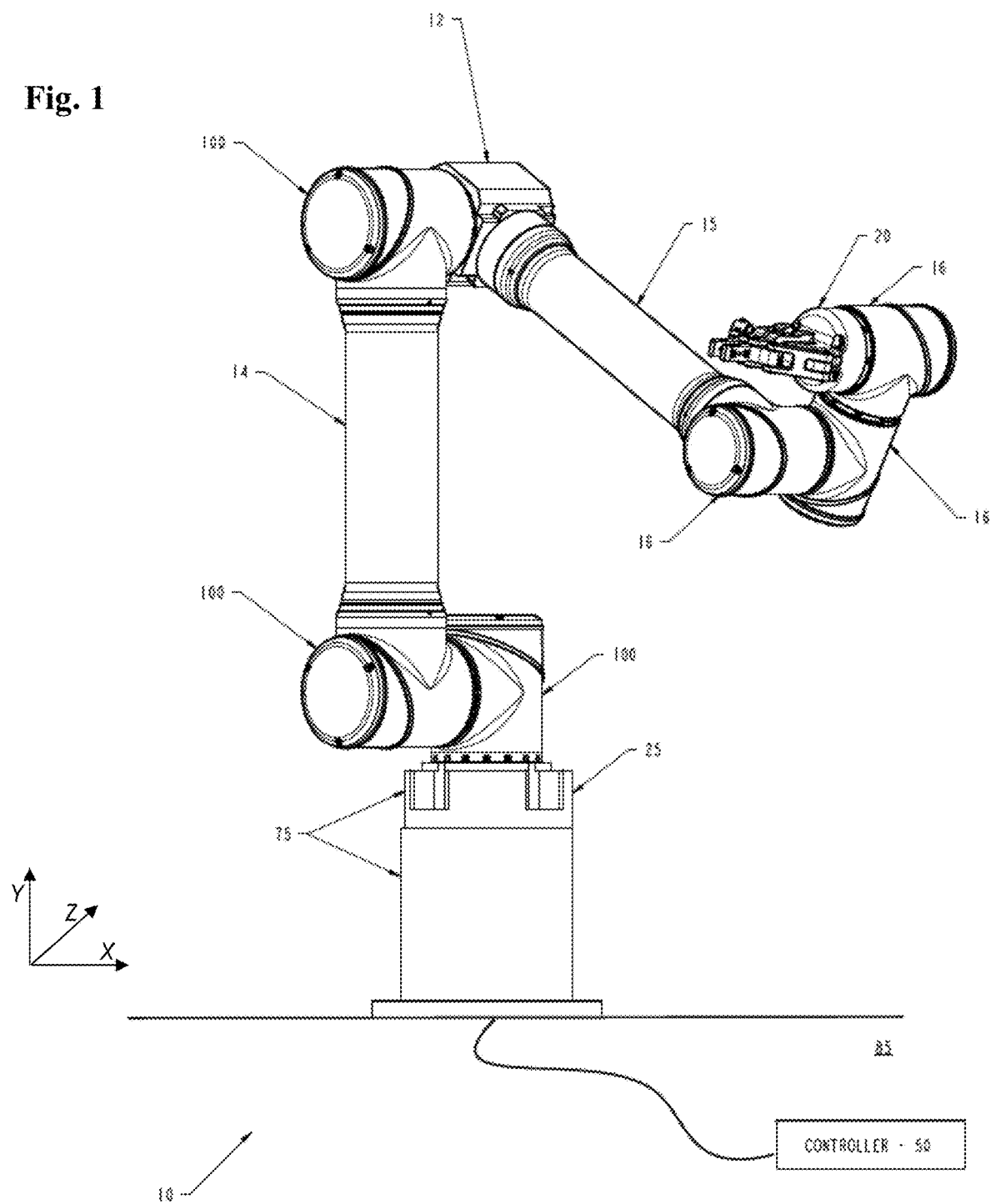
FIG. 1 is an illustration of a robotic system that includes robotic joints according to the teachings herein.

In FIG. 1, the robotic system 10 includes a multi-axis industrial robot 12 and a tool 20. For purposes of this introduction, the tool 20 may be any type of device deemed appropriate by a system operator. Overall operational control of the robotic system 10 may be achieved via a controller 50 via execution of a method. Generally, the controller 50 may include any type of computer, controller, microcontroller, networked controller or other similar device useful for controlling the robot 12 and the robotic joints 100. A more detailed description of a suitable controller 50 is provided further herein.

The robot 12 of FIG. 1 may be embodied as a conventional 6-axis industrial robot as shown, and therefore may a plurality of robotic joints 100, at least some of which are shown in FIG. 1. The various joints 100 connect segments or serial linkages of the robot 12, including a lower arm 14, an upper arm 15, and a wrist 16, and collectively provide the desired range of motion and number of control degrees of freedom needed for performing assigned work tasks.

Examples of such work tasks that may be accomplished with the robot 12 include the grasping, lifting, locating, placing of goods, along with a host of other possible tasks such as painting, welding, soldering, disassembly, assembly, picking, planting, pruning, cutting, harvesting and other tasks as may be performed by a typical robot. Joint position sensors may be positioned with respect to each joint 100 and configured to measure and report the measured position of each respective joint 100 to the controller 50. Additionally, one or more force sensors (not shown) may also be positioned with respect to each of the joints 100, e.g., the wrist 16, and used to provide force or torque feedback to the controller 50. Accordingly, the controller 50 may be configured to avoid application of excessive force on the work piece during execution of the method.

For the purposes of the present description, the robot 12 may include a base 25 that is fixed or mobile and a stand 75 for the robot 12 may be fixed with respect to a floor 85 or suspended from a vertical surface such as a machine column or wall or affixed in an overhead position. The stand 75 may have a predetermined position in a Cartesian (e.g., X, Y, Z) frame of reference, and thus provides a calibrated reference point for zeroing of the robot 12 during reconfiguration.

Figure 2:
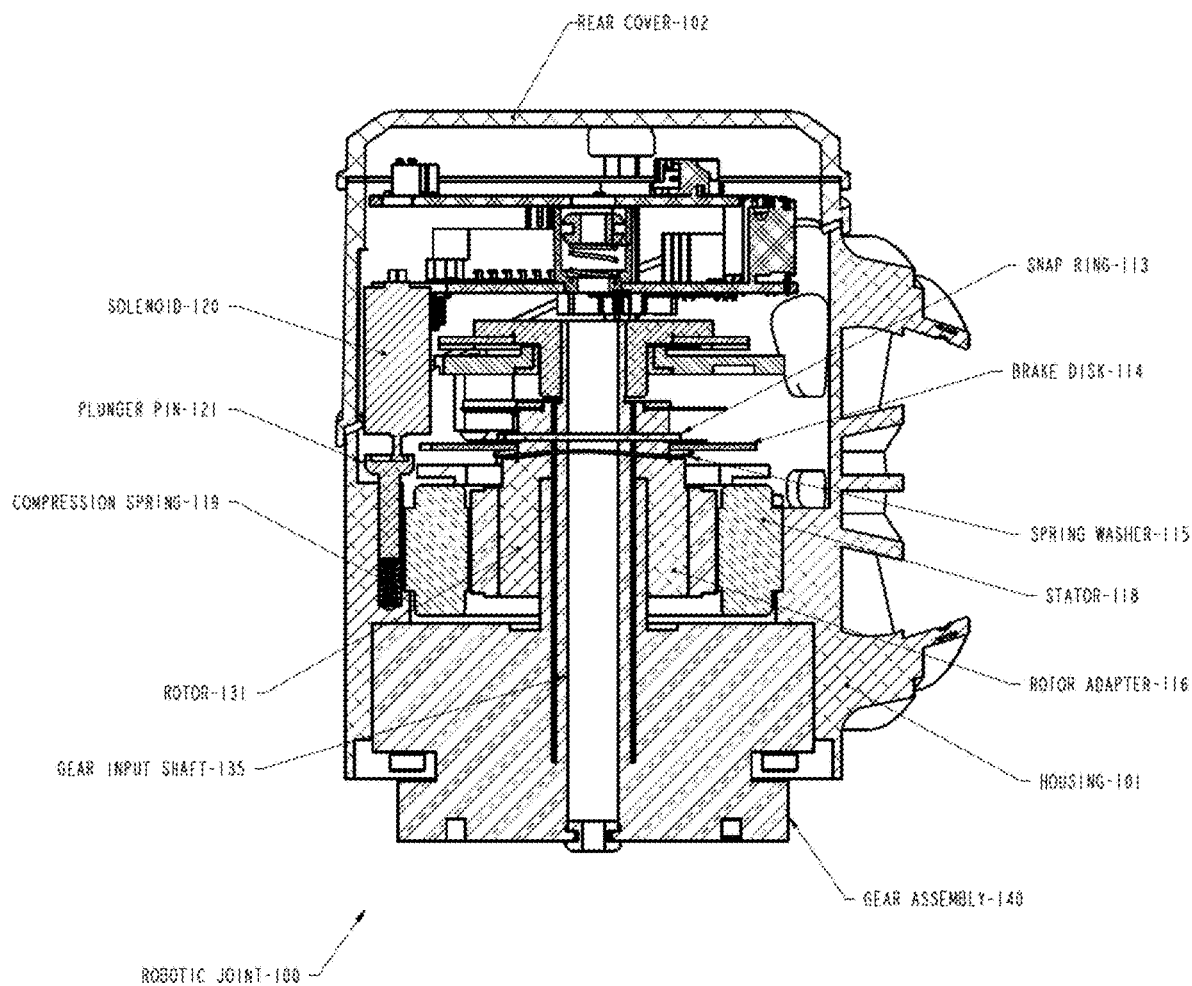
FIG. 2 is a cut-away view of an exemplary embodiment of a robotic joint.
Figure 3:
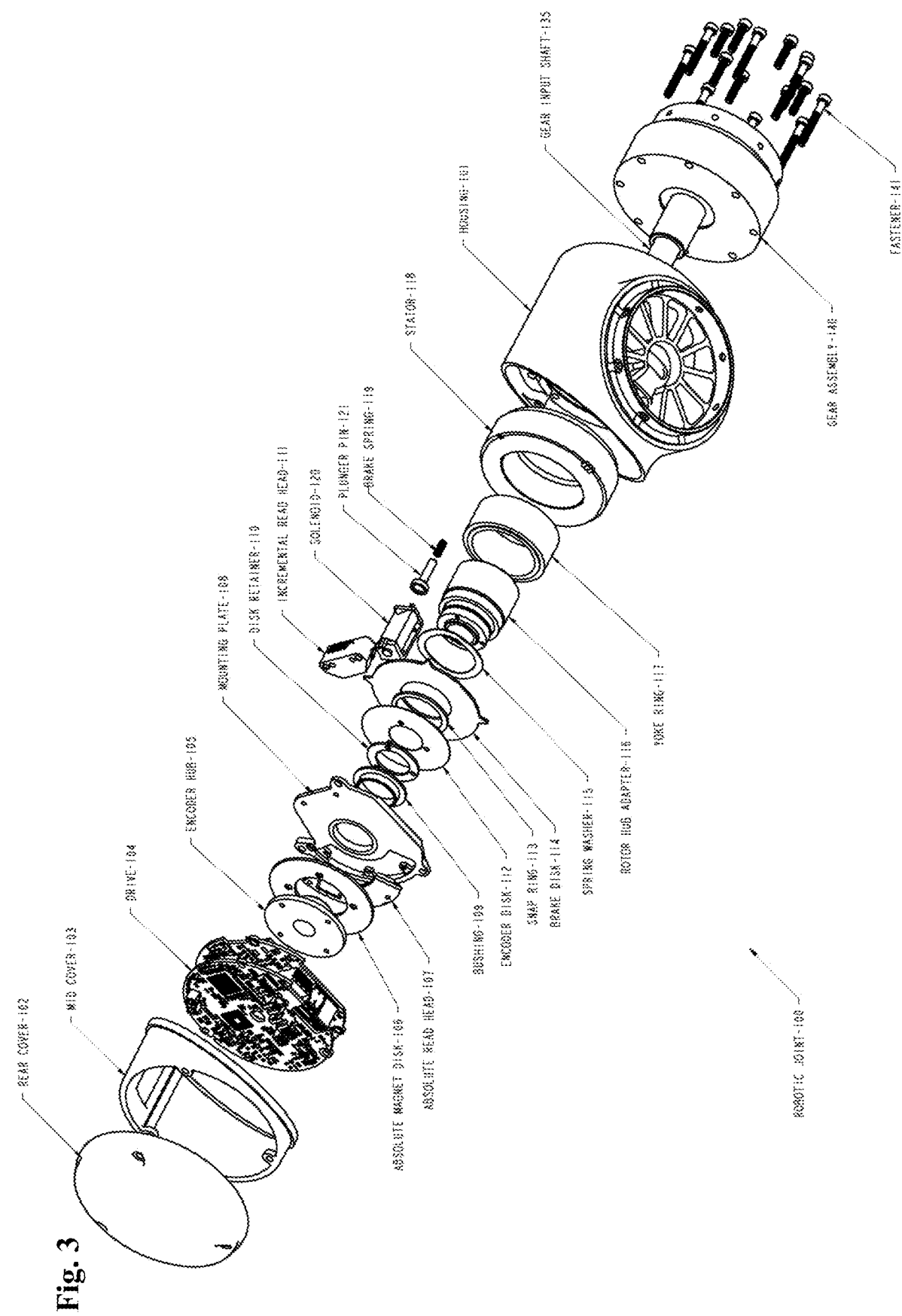
FIG. 3 is an exploded view of the embodiment depicted in FIG. 2.

Each of the joints 100 illustrated in FIG. 1 include a new and novel design. An embodiment of the design is illustrated in FIGS. 2 and 3. In FIG. 2, a cut-away view of the joint 100 is provided. In FIG. 3, an exploded view diagram is provided.

Referring now to FIGS. 2 and 3, it may be seen that the robotic joint 100 includes a housing 101. The housing 101 contains mechanical and at least some of the electrical components of the joint 100. Included is a motor assembly containing motor related components such as a stator 118, yoke ring 117 and rotor hub adapter 116. The motor assembly is configured to receive a gear drive shaft 135 from a gear assembly 140. The gear assembly 140 itself may be fastened to the bottom of the housing 101 using fasteners 141 such as screws.

Placed atop the rotor hub adapter 116 is a spring washer 115 onto which a rotating brake disk 114 or wheel is placed. The brake disk 114 is held in place using a snap ring 113. An encoder disk 112 is placed on the assembly and retained using a disk retainer 110. A mounting plate 108 with a bushing 109 is installed above the disk retainer 110. Installed with the mounting plate 108 is an absolute read head 107. An absolute encoder magnet disk 106 is attached to an absolute encoder hub 105 which is installed above the assembly. Also included inside the housing 101 and above the absolute encoder hub 105 is the joint drive 104, which is a circuit board assembly with electronics for driving and controlling the joint 100. A mid cover 103 is fastened to the housing 101 to contain the components and to act as a mount for the rear cover 102. In the embodiment shown, a braking system is also provided. The braking system provides for slowing and stopping of the joint 100 as needed.

Collectively, for purposes of discussion herein and in general, the absolute read head 107, the absolute encoder hub 105, the incremental read head 111, the encoder disk 112 and the encoder hub 105 provide an "encoder assembly." Other components as deemed appropriate may be incorporated within or regarded as a part of the encoder assembly. For example, the disk retainer 110, mounting plate 108, and the bushing 109 may be regarded as a sub-components of the encoder assembly.

In operation, the encoder assembly functions as a sensor to measure rotation. By measuring rotation, determinations of displacement, velocity, acceleration, or the angle of a rotating sensor may be realized. A typical encoder uses optical sensor(s), a moving mechanical component, and a special reflector to provide a series of electrical pulses to a microcontroller. These pulses can be used as part of a PID feedback control system to determine translation distance, rotational velocity, and/or angle of a moving robot or robot part. In the example provided herein, the encoder assembly makes use of magnetic technologies.

Figure 4:
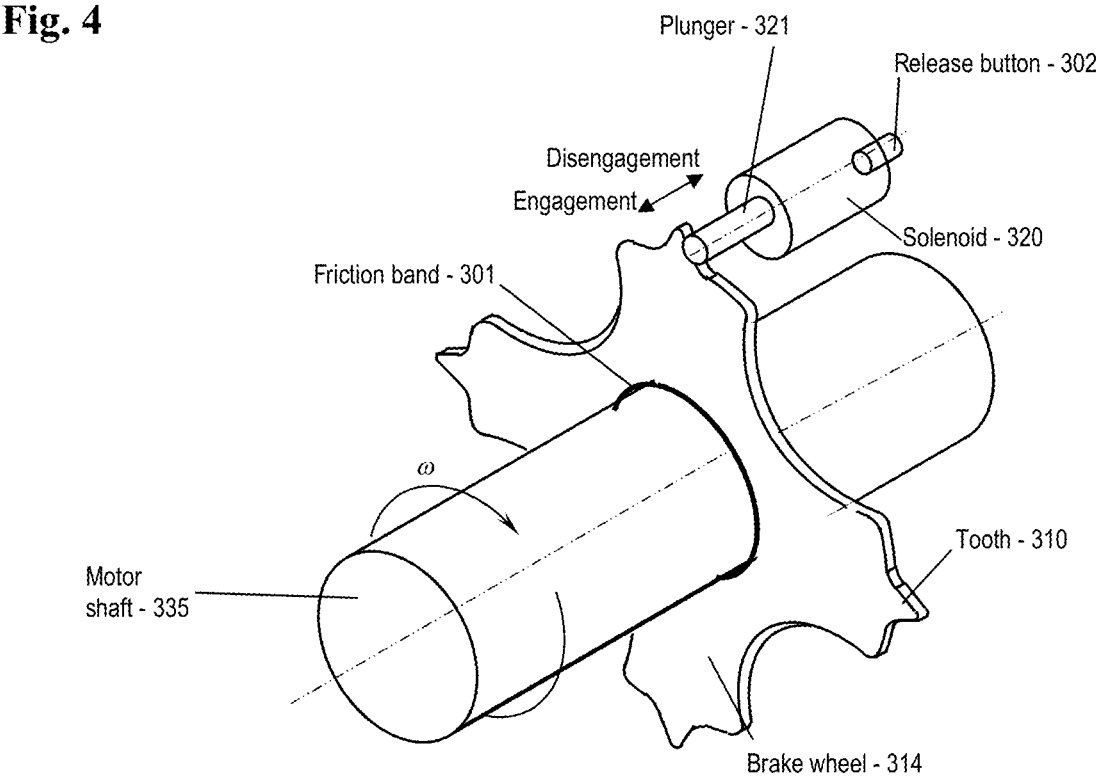
FIG. 4 is a schematic view of a prior art braking system for a robotic joint.

As shown in FIG. 4, with regard to the prior art, braking has typically been accomplished using a solenoid 320 that interacts with a rotating brake wheel 314. The brake wheel 314, mounted on the motor shaft 335, has a number of teeth 310 that are equally disposed on the outermost circumference. The brake wheel 314 is configured to slow and eventually stop rotation of the motor shaft 335 by frictional engagement of a friction band 301 disposed between the brake wheel 314 and the motor shaft 335. The solenoid 320 has a plunger 321 that can be controlled to engage and disengage along a centerline of the solenoid 320. When braking action is implemented using the solenoid 320, the plunger 321 extends forward to the brake wheel 314 for engaging the tooth 310. When the tooth 310 is engaged, rotation of the brake wheel 314 ceases and the motor shaft 335 is restrained. When the plunger 321 retracts, the brake wheel 314 is disengaged and rotation of the motor shaft 335 may resume.

Figure 5A:
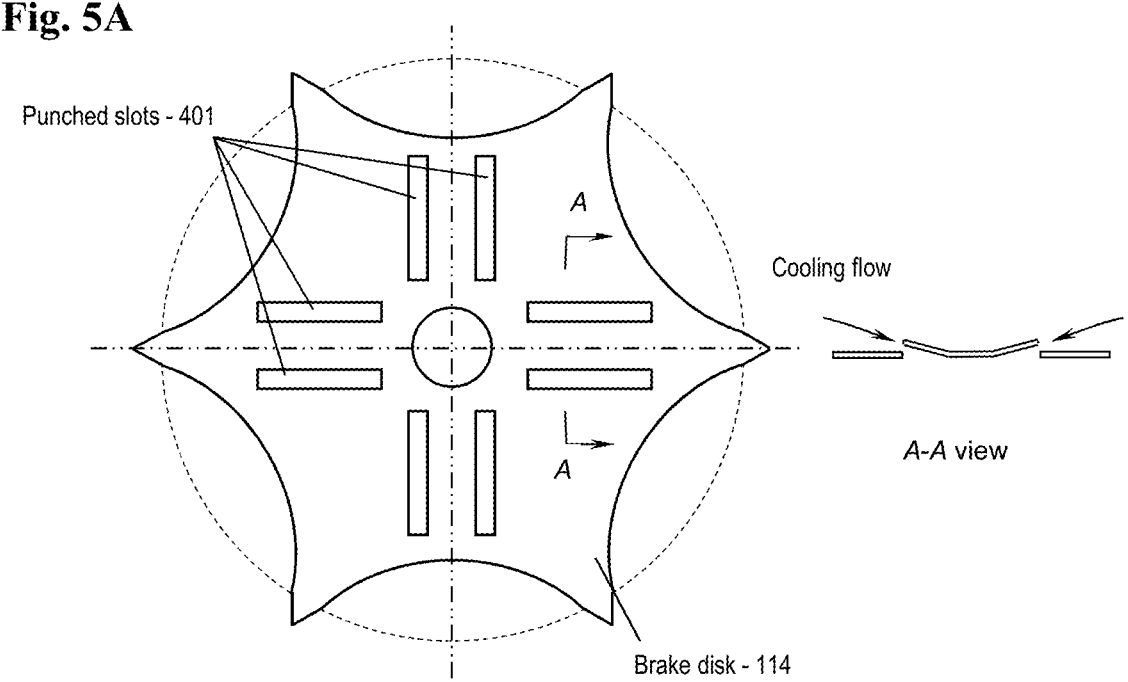
FIGS. 5A and 5B, collectively referred to herein as FIG. 5, are schematic diagrams depicting embodiments of a brake disk for the robotic joint according to the teachings herein.
Figure 5B:
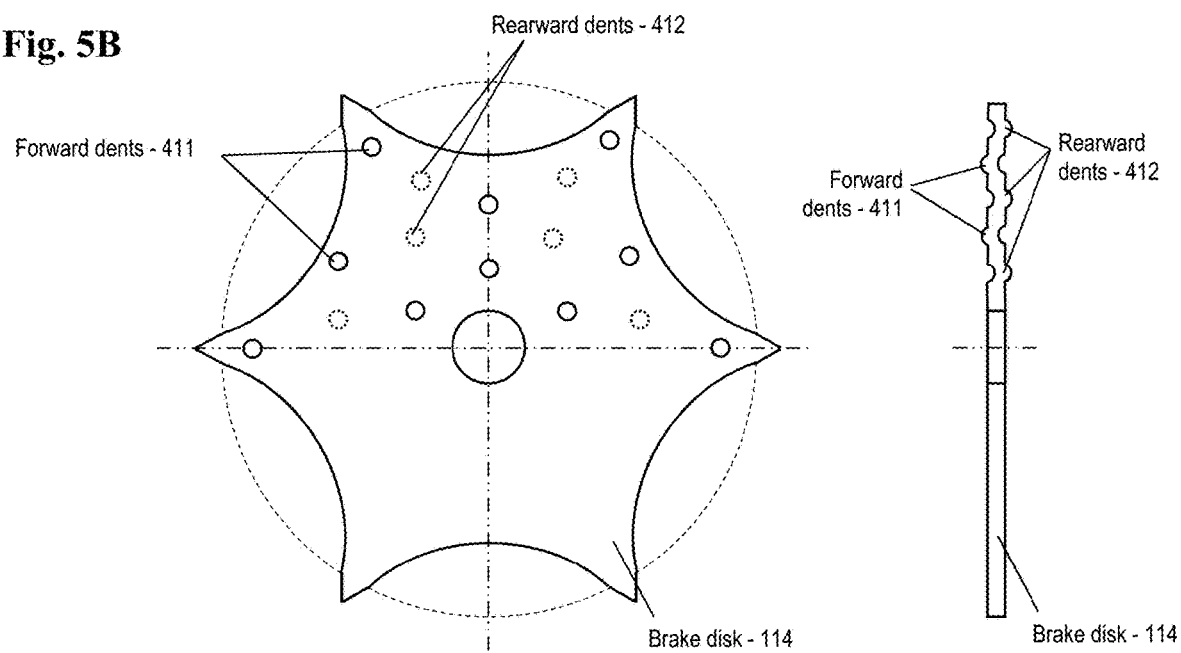

Referring now to FIGS. 5A and 5B, collectively referred to herein as FIG. 5, embodiments of the brake disk 114 disclosed herein are shown. In operation, the brake disk 114 operates in a manner similar to the prior art brake wheel 314. Advantageously, the brake disk 114 may be configured so as to enhance convective heat transfer. For example, the brake disk 114 may incorporate features useful for generating air cooling flows inside the joint assembly to help keep joint components, such as drive electronics, solenoid, servo motor and harmonic drive gearing system at lower temperature. Non-limiting examples of such features include fins, dents, bumps or other such features on the brake disk 114. FIG. 5A shows punched slots 401 on the brake disk 114 in a first exemplary embodiment. The punched slots 401 provide optional cooling vents, and operate much like blades of a fan. In another exemplary embodiment, as illustrated in FIG. 5B, punched dents 411, 412 on the brake disk 114 are used to reduce or manage temperature. In operation, as the shaft of the motor rotates, the part generates a velocity field to cool the components of the joint 100. An alternative design for the brake wheel is shown in FIG. 6.

Figure 6:
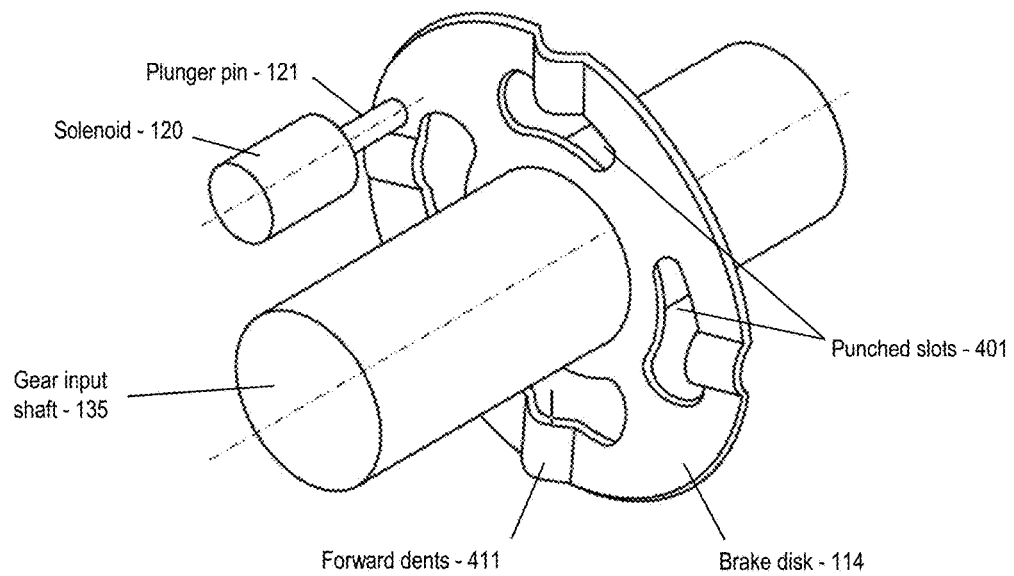
FIG. 6 is a schematic diagram depicting a further embodiment of a brake disk for the robotic joint according to the teachings herein.

In FIG. 6, the brake disk 114 includes punched slots 401 that are oriented in a circumferential direction. Forward dents 411 are included and provide the desired effect discussed with regard to FIG. 5B. In this embodiment, the forward dents 411 also provide a stop feature. That is, the forward dents are configured to interact with the plunger pin 121 of the solenoid 120. When the solenoid 120 is actuated, the plunger pin 121 is extended and into engagement with the forward dent 411, thus constraining rotation of the gear input shaft 135.

In an alternate embodiment, the joint 100 may be configured in such a way as to improve manufacturability and reduce the number of components. Advantages of such a design include reduced material cost by using fewer components, reduced labor time during manufacturing of the joint 100 and improved quality. Simplified manufacturing process reduces the potential for operator error during manufacturing as well as resulting in improved reliability, reduced axial length of assembly and improved cooling due to airflow inside the housing 101.

Figure 7A:
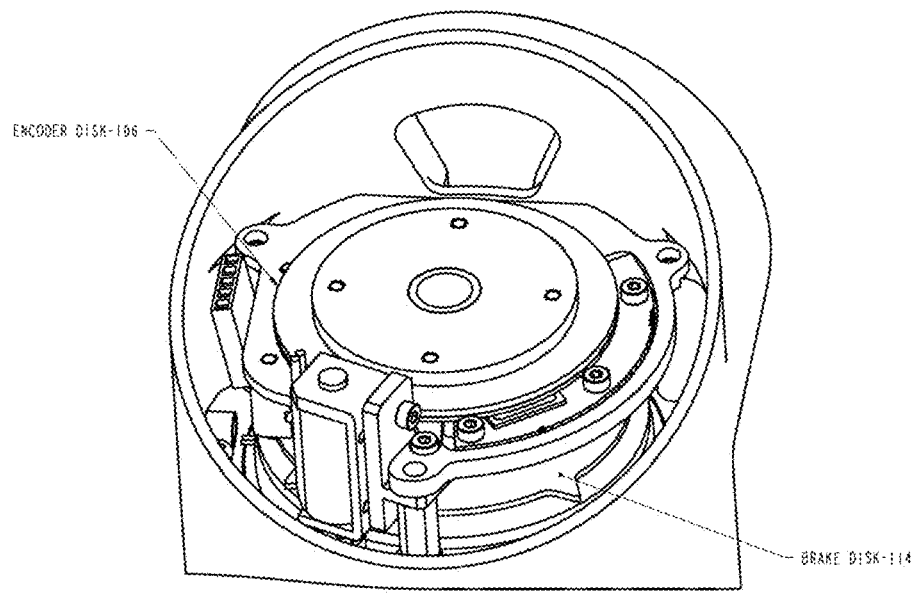
FIGS. 7A and 7B, collectively referred to herein as FIG. 7, are perspective diagrams of an encoder disk (FIG. 7A) and a combination encoder/brake disk (FIG. 7B) according to the teachings herein.
Figure 7B:
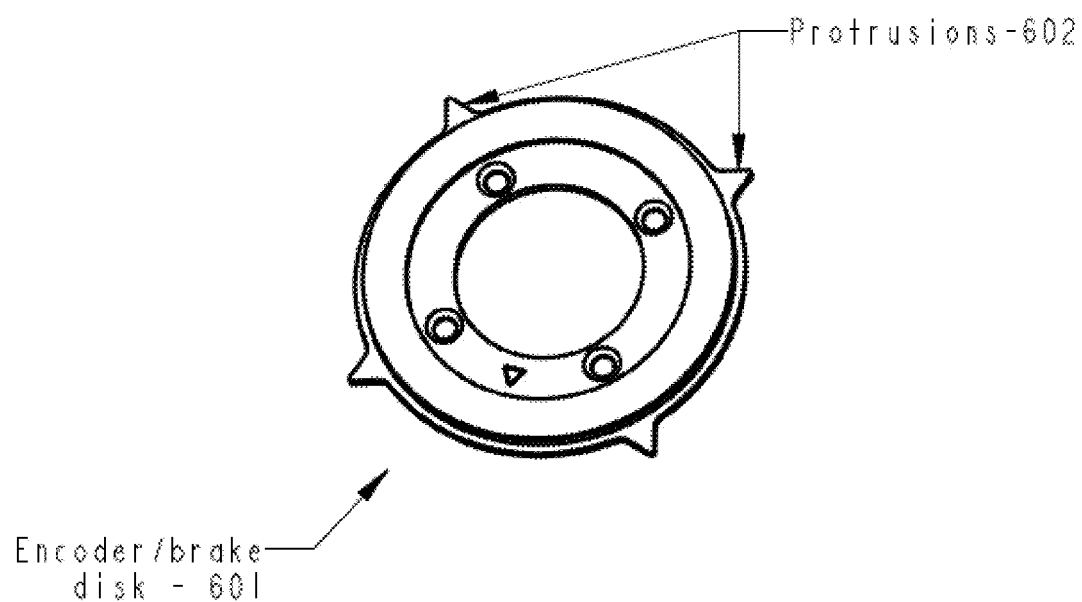

For example, instead of using a separate encoder disk 112 and brake disk 114 as (partially) shown in the embodiment depicted in FIG. 7A, both parts are combined into a single component as illustrated in FIG. 7B. By adding protrusions to the outside diameter of the steel backing plate of the magnetized encoder disk 112, the functionality of the encoder disk 112 and the brake disk 114 are incorporated into a unitary encoder/brake disk 601. In addition, protrusions 602 added at the periphery of the unitary encoder/brake disk 601 provide a flux return path for the magnet disk 106 and as the brake rotor. Further, the unitary encoder/brake disk 601 may include features such as notches, bumps and slots (as introduced with regard to FIG. 5) to provide for enhanced ventilation. The features may be added, for example, in the areas between mounting holes. Advantageously, this enables the functionality of a brake wheel, encoder disk, and fan all in one compact unit.

Collectively, for purposes of discussion herein and in general, the brake disk 114, the solenoid 120, the brake spring 119, the plunger pin 121, and the drive 104 provide a "controller assembly." Other components as deemed appropriate may be incorporated within or regarded as a part of the controller assembly. For example, the encoder assembly may be regarded as a sub-component of the controller assembly.

Figure 8:
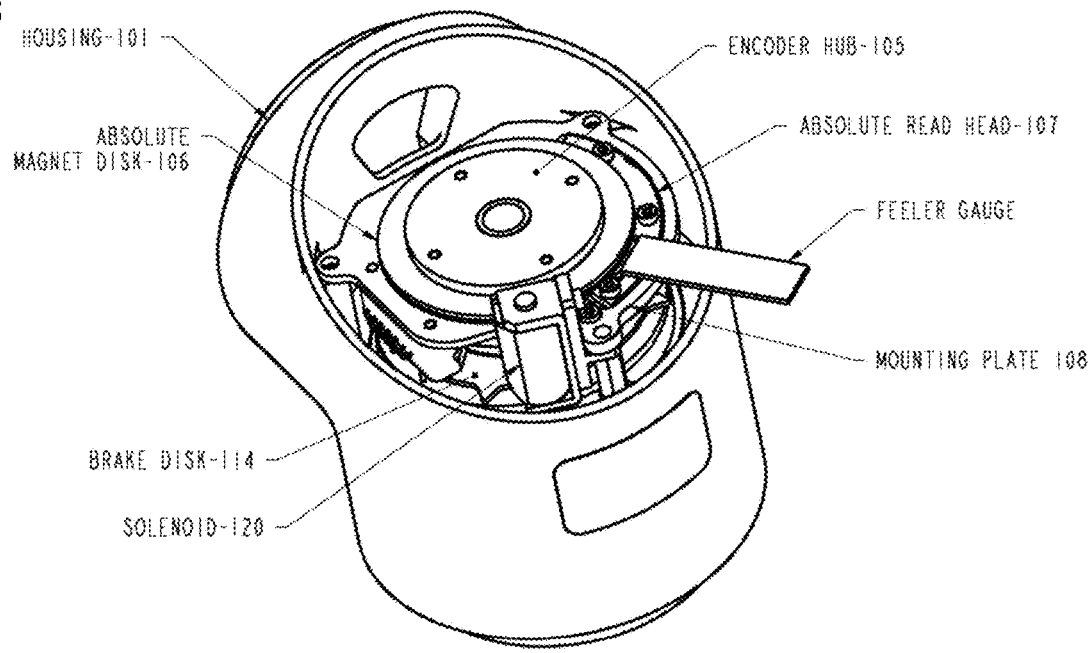
FIG. 8 is a perspective diagram depicting aspects of a process for adjusting an encoder gap between an absolute read head and an absolute magnet disk for an embodiment of the joint disclosed herein.

Turning now to FIG. 8, in an additional exemplary configuration, a gap between the encoder disk 112 and an absolute read head 107 (the "encoder gap") is adjusted using a feeler gauge. In presently available devices, setting the encoder gap in a housed joint where there is limited operator access is a labor intensive process and unreliable. By fixing the location of the absolute read head 107 and permitting adjustment of the location of the encoder disk 112, the operator can easily set the encoder gap using a simple feeler gauge.

Figure 9:
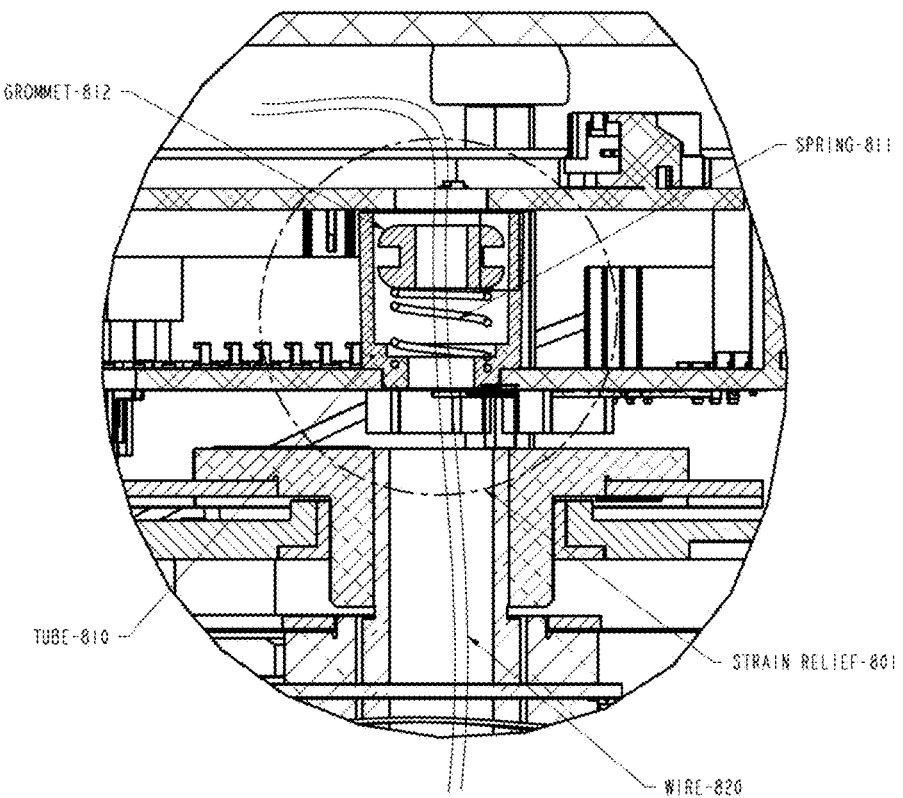
FIGS. 9 and 10 are cross-sectional diagrams of an embodiment of the joint disclosed herein (FIG. 9 providing an exploded view)

An additional feature that may be implemented, as shown in FIG. 9, is a mechanical strain relief 801 for wire 820 passing through the joint 100. Electrical wires 820, when passed through a rotating hollow shaft and without proper alignment, can come into contact with the rotating shaft and cause an electrical short. By integrating tube 810, grommet 812, and a coil spring 811, the electrical wires 820 are protected as they pass through the joint 100. In this example, the spring 811 and the grommet 812 are confined within the tube 810. The spring 810 provides an upward bias to the grommet 812, thus maintaining a smooth entrance for the wire 820. Also, in a robotic joint, the wires 820 can twist during normal operation of the joint. As the wires twist, length of the wires is shortened. The shortening results in a strain to the components unto which the wires are attached. In FIG. 9, the wires 820 are securely attached to the grommet 812. As the wires twist and shorten, the spring 811 acts on the grommet 812 pushing it upwards along with the wires. This action provides strain relief of the wires within the robotic joint.

Figure 10:
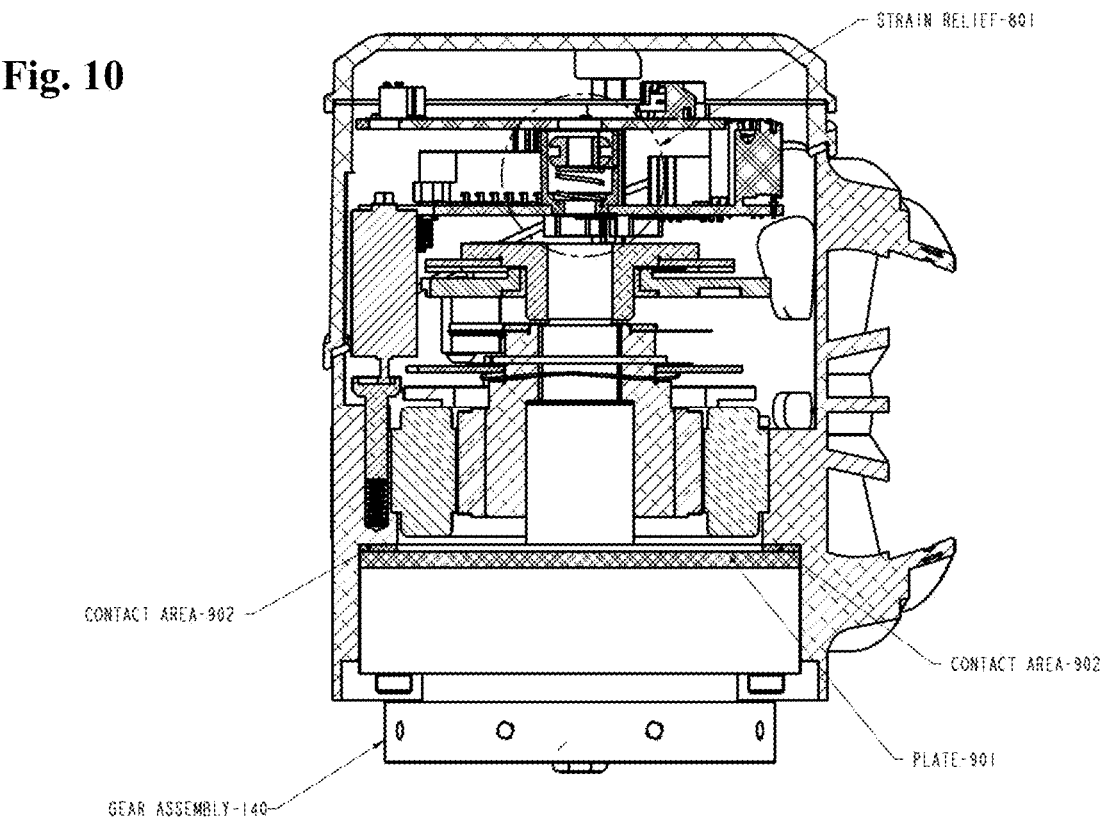
Figure 11:
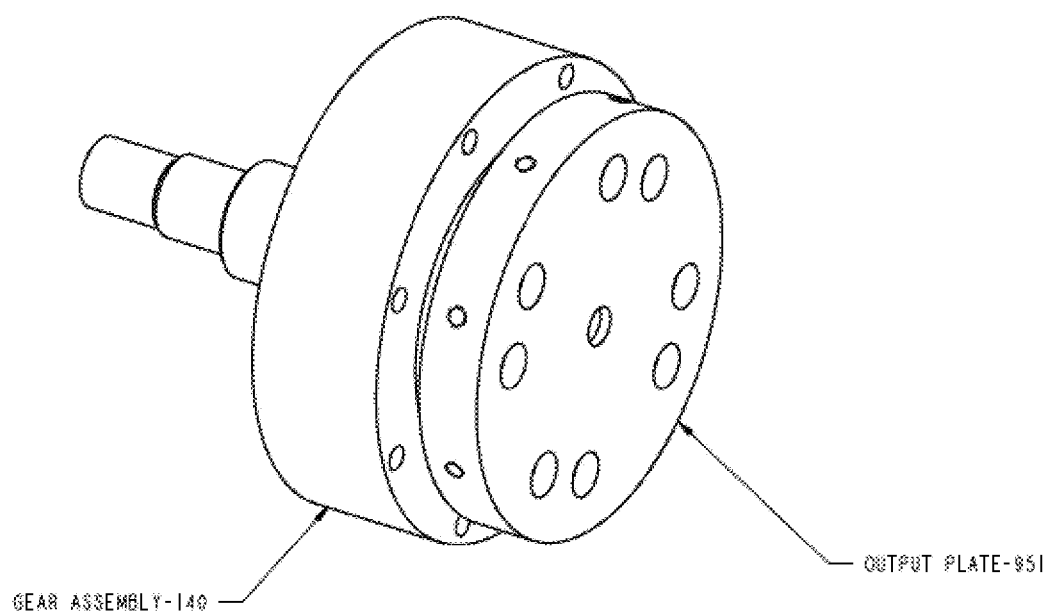
FIGS. 11 and 12 are perspective views of a gear assembly included in various embodiments of the joint disclosed herein.
Figure 12:
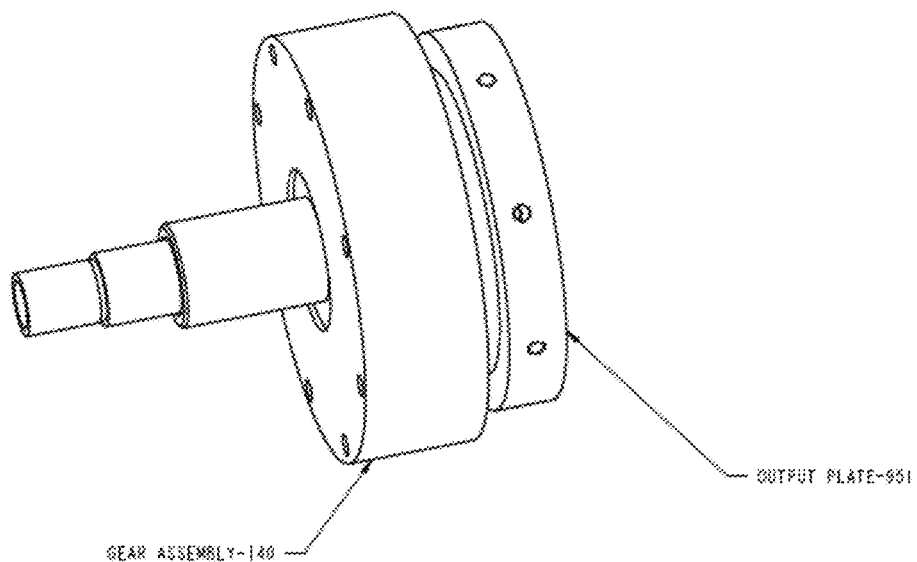

Referring now to FIG. 10, an alternate embodiment of a fully assembled joint 100 is shown in a cross-sectional view. The embodiment depicts several additional optional features relative to the joint 100 shown in FIGS. 2 and 3. In this example, the gear assembly 140 is a harmonic gear assembly. Sitting atop of the gear head assembly 140 is plate 901 and contact areas 902. Contact area 902 may be subjected to high contact pressure. An embodiment of a harmonic gear assembly is shown in FIG. 11 and FIG. 12 for reference.

Figure 13:
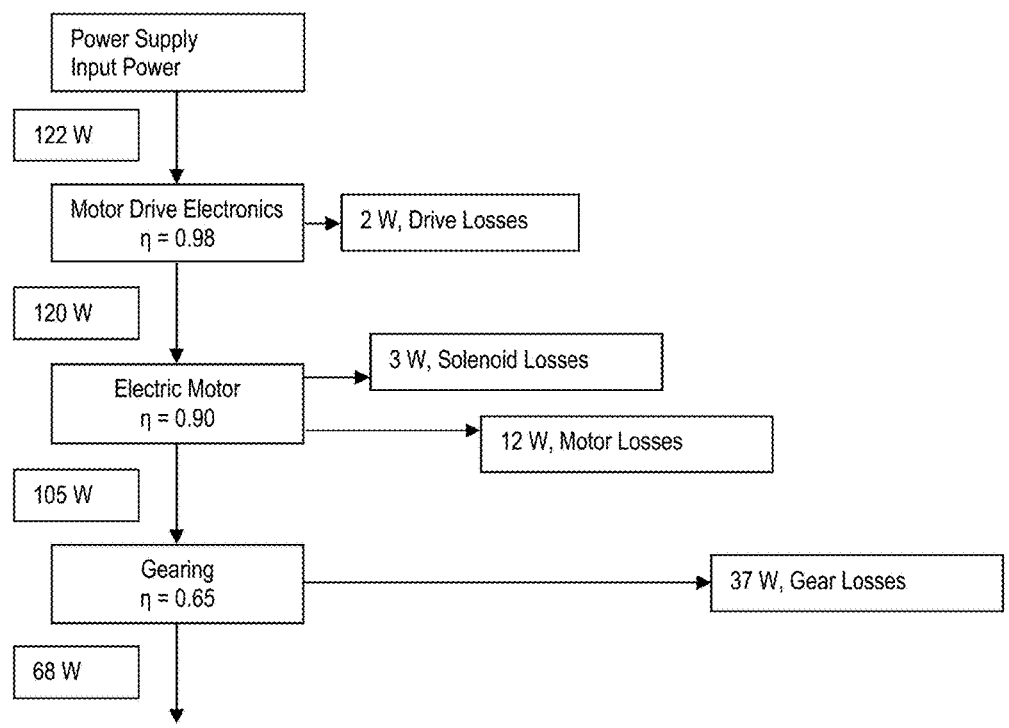
FIG. 13 is a flow chart that depicts aspects of heat dissipation and power flow for an embodiment of the joint disclosed herein; and, FIGS. 14, 15 and 16 are perspective views of a portion of an embodiment of the joint disclosed herein, with emphasis on a design for the solenoid.

Referring now to FIG. 13, a detailed analysis of the heat dissipating areas of the joint 100 are illustrated and quantified. As shown, nearly 70% of the heat dissipation in the joint 100 comes from the harmonic gearing assembly. The heat dissipation occurs due to the losses in the gear meshes, bearings, seals, and lubricants. If the heat generated by the harmonic gearing assembly can be effectively dissipated, it will be very impactful on the temperature rise of the joint, and thus provide longer life, higher reliability, and better performance. In this example, the joint size is a size 14 estimated with the motor running at 3500 rpm.

In FIG. 13 the input power from the power supply is shown and depicts the flow of that input power and how it flows into the output power by the joint and the power dissipation or losses due to efficiencies. The solenoid for the brake although small is a significant contributor to the power dissipation and is a hot spot inside the motor Having introduced embodiments of the joint 100, some additional aspects and features are now presented.

Generally, the combined encoder disk, brake disk, and fan permits use of a magnetic encoder and placement of a read head on the brake (encoder wheel and brake wheel function as one unit). Further, as introduced above, the combined fan and brake disk function arising from putting fin feature/ dents/bumps on the brake wheel generates more air flow inside the joint assembly to help keep drive electronics at lower temperature.

Thermal self-protection may be closely monitored and controlled by using linear thermal sensors in the joint to monitor real time temperature, send temperature data to the controller, and controlling performance to control heating of the joint and components therein. In some embodiments, at least one sensor configured for monitoring a performance parameter is disposed therein. The performance parameter may include at least one of temperature, stress, strain, load, position, rotation, and acceleration.

Improved gear cooling may be realized through use of aluminum and other materials which also enable weight reduction and high thermal conductivity in components of the joint. Weight reduction and improved heat transfer from gear to housing may also be improved by selection of appropriate materials. A stainless steel shaft may be used to reduce heat transfer from the motor into the gear.

By providing an easily adjustable encoder gap, the manufacturing, and adjustment of the disc location and stationary read head is facilitated. Generally, the encoder gap may be set with a feeler gauge.

Including a cast solenoid mount in the housing results in improved heat transfer from the solenoid coil to the outer environment. Similarly, potting of the solenoid to a mount results in improved heat transfer away from the solenoid.

In some embodiments, at least one light pipe and a semi-transparent or transparent rear cover is used. These features may also make the light emitting diodes (LED) on the drive visible on the rear cover of the joint and useful for indicating status thereof.

Generally, the rear cover may be a snap on/off cover, and requires no tools for removal or assembly. The rear cover may be fabricated from aluminum, plastic or other material that limits electromagnetic interference (EMI). The rear cover may include heat sink features such as at least one of fins and bumps to improve structure, cooling and reduce EMI (emissions).

The housing may include a user accessible button for user initiated and manual brake release. The button may be recessed. The user accessible button generally allows the user to manually release the brake without removing the cover.

In some embodiments, potting of the stator is employed to improve heat transfer from gearing and the motor assembly to the housing.

In some embodiments, a permanent magnet slip brake clutch uses a steel brake disc and permanent magnet to allow slip torque rather than a wavy washer.

In some embodiments, the housing is coated with materials suited for providing improved cooling.

In the gear assembly, heat dissipation occurs due to the losses in the seals, grease, and the gear meshes. If the heat generated by the harmonic gearing assembly can be better dissipated, it will be very impactful on the temperature rise of the joint, and thus provide longer life, better reliability and reduced cost. Thus, in an alternate embodiment of the robot joint 100, heat transfer from the body of the harmonic gear assembly into the housing 101 is improved. This is accomplished by replacing a conventional steel plate 901 with a plate 901 made of aluminum. The contact areas 902 are subject to high contact pressure and thus allow very high heat transfer rates into the aluminum housing through the now much more conductive aluminum plate. Furthermore a front output plate 951 (as shown in FIG. 11), may also be made from aluminum instead of steel. In addition to improved heat transfer, this will also considerably reduce the weight of the gear assembly. As shown herein, weight is reduced by around 17 to 35%.

In another alternate embodiment, another improvement to reduce the heat transfer from the motor portion into the gearing is to make the shaft out of stainless steel instead of regular steel. This significantly reduces the heat transfer down the shaft into the bearing in the harmonic gear assembly as shown in FIG. 10.

Figure 14:
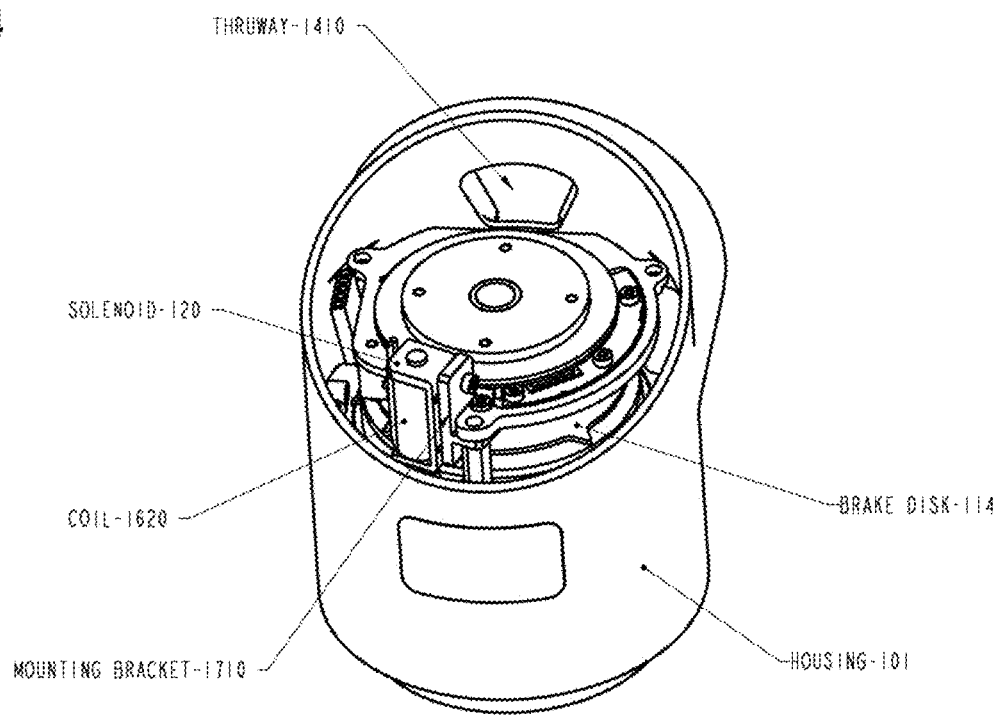

In still another alternate embodiment of the joint, in order lower the temperature inside of the joint 100, there is provided an improved mounting method for a coil of the solenoid 120. The mounting method provides for more efficient dissipation of heat within the joint 100. In one design of the joint 100, the brake is very space efficiently designed as a thin plate with a solenoid actuator to deliver a "pin/spoke" type of brake. The solenoid plunger acts as a pin in which the pin is plunged down to actuate a rod to interact with the spoke on the thin plate. This solenoid plunger is powered by a coil, which in turn has a voltage applied to it. The coil is heated by the current passing through its windings, in the form of resistive heating. An example of a design is shown in FIG. 14.

Temperature measurements of the coil show that the coil tends to be very hot compared to the rest of the components in a robotic joint. Measured temperatures have been seen as high as 110 degrees Celsius on the body of the solenoid. This high temperature heats up the surrounding components and limits the life of the coil. A failure of the solenoid coil results in complete failure of the joint when the brake is applied. The other surrounding components are at a much lower temperature.

Figure 15:
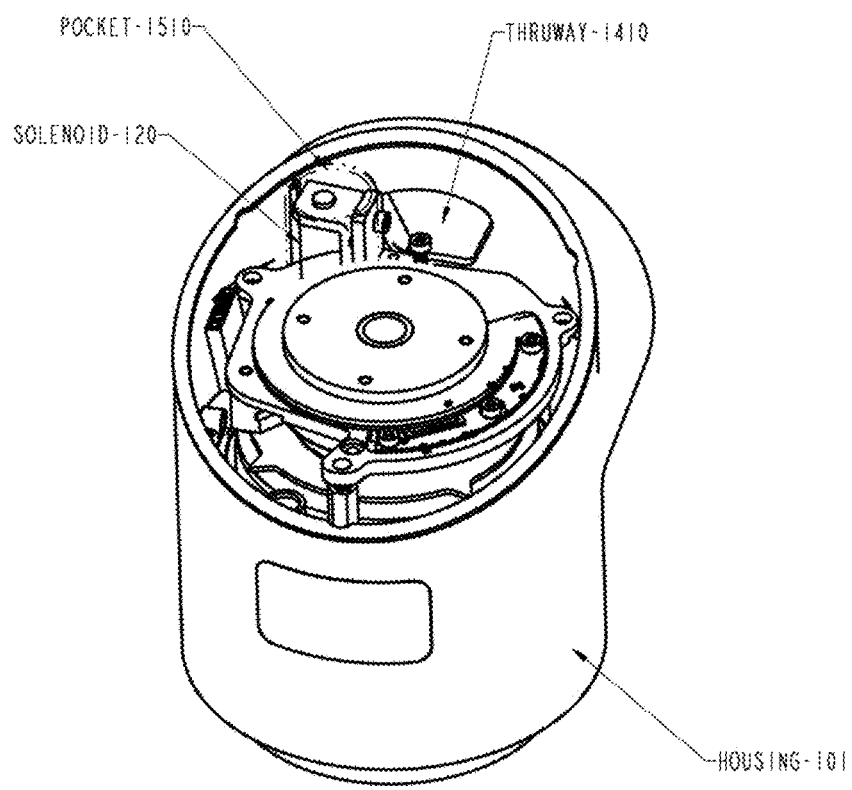
Figure 16:
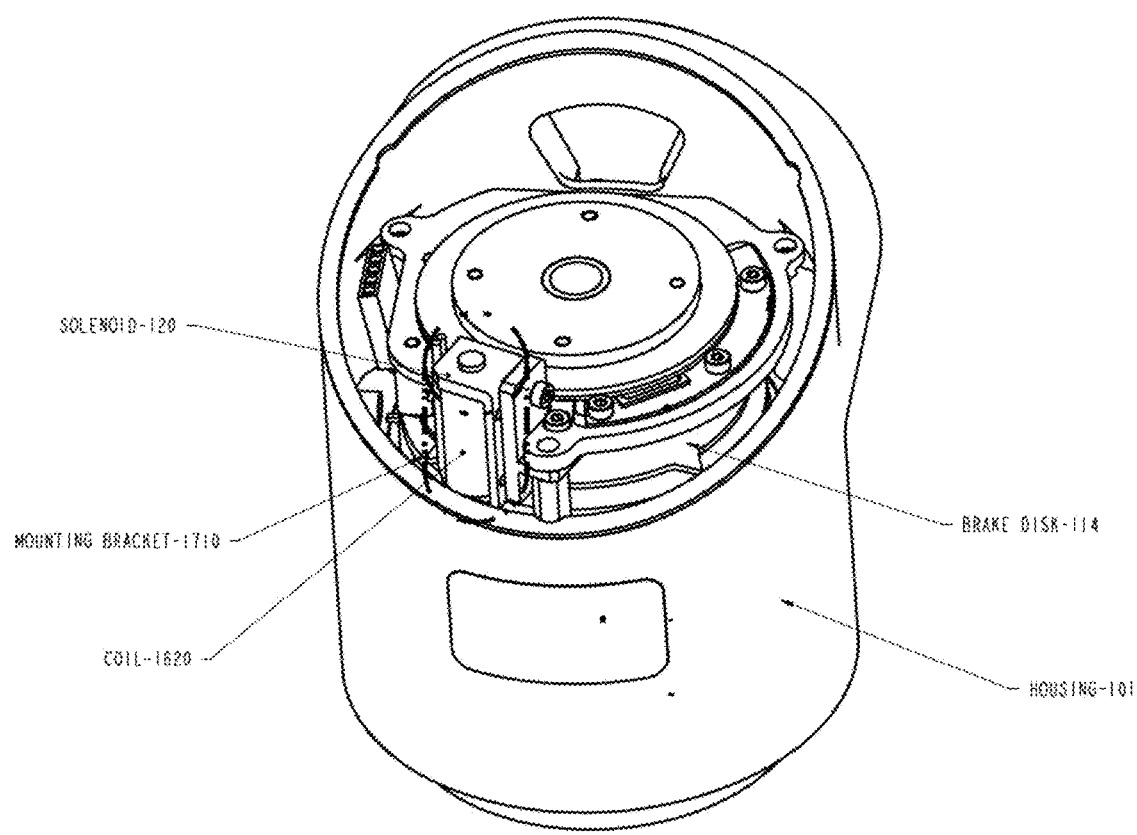

Generally, elevated temperature in the gearing section degrades the life of the joint. Temperatures in excess of seventy degrees Celsius will have a significantly negative impact on life of the joint 100. In order to accomplish heat reduction objectives, instead of the conventional mounting bracket for the coil 1620 (FIG. 14) a mounting surface for the coil 1620 may be cast into the housing 101, as shown in FIG. 15, and provided as pocket 1510. The housing 101 may be made of aluminum and most commonly made by die casting. This housing 101 provides excellent heat sinking for the solenoid coil, since pocket 1510 when cast into the housing 101 is in intimate contact between a mounting bracket (actually now a cast-in pocket) and the housing 101. Alternatively, the coil 1620 may be either potted into the pocket 1510 in the die casting (FIG. 15), or optionally potted to the mounting bracket 1710 (FIG. 16). Potting material selected may have a conductivity well in excess of 0.6 W/(m-K), which is many times that of air.

Also, as shown in FIG. 15, the solenoid 120 may be oriented next to a thruway 1410. Generally, the thruway 1410 provides an access way for cabling. In some embodiments, the thruway 1410 is left open (as depicted) and serves to increase ventilation and dissipation of heat from the solenoid 120. Additionally, air directing features (not shown) may be disposed in the vicinity of (or on or in contact with) the solenoid 120 and the thruway 1410. Examples of air directing features include fins, grills, irregular surfaces and the like. The air directing features may provide for channeling the air circulated by the novel brake wheel 114 disclosed herein.

It is to be noted that for all the embodiments of the robot joint, active thermal management may be used to improve reliability. This may be accomplished, for example, by continuously monitoring thermal device outputs on each joint to determine the temperature. This prevents exceeding thermal limits by actively reducing the current to the motor, thus staying at the maximum temperature but not exceeding the limits. The current limit reductions are subtle and nearly imperceptible to nearby operators. For example, while monitoring temperature, the temperature rise maybe modeled. If a prediction results in excessive temperature, then the current limits are cut back to 90%. If the temperature continues to rise, current limit is set to 80% and so on. At some point, this thermal management system stabilizes at a maximum thermal performance. As more headroom is predicted, the thermal limit is increased back to 100%. In a multi-axis robot with coordinated motion among the joints (FIG. 1), all motors may be proportionally adjusted based on any one motor prediction of exceeding the thermal limits.

As set forth above, in order to provide an improved robotic joint and to overcome the disadvantages and problems of currently available devices, there is provided a joint having improved operating capabilities and enhanced reliability, including systems and methods for avoiding electrical, thermal and mechanical breakdowns of the joint.

In normal operation of a robot, heat is generated from the motor, solenoid, drive, etc. inside each joint, which must be dissipated from the robot effectively to allow acceptable temperatures to ensure safe and long term reliability of the robot. It is very important to keep a robotic joint cool in order to maintain the reliability of the joint. Some of the benefits of keeping the joint cool include greater life, better performance and higher operating reliability. The life of the gearing is highly dependent on keeping the gear lubrication below the allowable temperature. The lubrication of the bearing is also critical to keep cool. In general, life is halved for every additional ten degrees Celsius temperature rise in the lubrication. Many of the robotics applications require life on the order of 20,000 hours, which helps justify the use of robots, as once payback time becomes attractive, the long-lived robot continues to deliver return on investment for the robot purchaser beyond just the initial typical eighteen month payback period for collaborative robots. This increased reliability is accomplished with very small impact to cost, thus significantly improving the return on investment attribute of owning the robot.

Heat generated in a robotic joint is far from uniform. Hot spots may occur near some heat sources such as motor stator windings. Another benefit of the novel system described herein is the elimination of hot spots. Some applications such as collaborative robots require the skin temperature of the robot to remain low to avoid burns to its adjacent human co-workers. By keeping the joint cool, the life of lubricants and other heat sensitive components such as feedback devices is extended.

Materials used in the joint may be selected for being lightweight when compared to other materials conventionally used for a given component. For example, aluminum or an alloy thereof is lightweight in comparison to steel. Materials used in the joint may be selected for exhibiting high thermal conductivity when compared to other materials conventionally used for a given component. For example, aluminum or an alloy thereof may exhibit high thermal conductivity in comparison to steel. Conversely, some components may be fabricated from materials selected for exhibiting low thermal conductivity. For example, a shaft of the motor assembly may be fabricated from stainless steel in order to limit thermal conductivity to the gear assembly.

The new and novel robot joint described herein includes, among other things, a combined encoder disk/brake disk/fan, a brake wheel having fin feature/dents/bumps to generate air flow inside, thermal self-protection, improved gear cooling, selection of predetermined materials to reduce heat transfer to sensitive components while increasing heat transfer to the surroundings, encoder gap adjustability, the housing configured with a cast solenoid mount, light pipes and semi-transparent rear cover, snap off cover, strain relief for internal wires, rear cover configured as a heat sink, and a recessed button for brake release.

A particular advantage of the above new and novel system is that the robot joint has an improved mechanical, thermal, electrical and reliability profile relative to presently available devices. In particular, there is provided enhanced convective and conductive heat transfer inside the robot joint.

Another advantage is the reduced number of joint components. This leads to simplifying the structure of the robot joint helping in the design of a compact robot joint and enhancing the robotic joint reliability.

Still another advantage is enabling one part of the joint to perform multiple-functions and providing increasing overall operating reliability.

Generally, the controller 50 has one or more central processing units (processors). Processors are coupled to random access memory (RAM) (also referred to "system memory," or simply as "memory") and various other components via a system bus. The controller 50 may include read only memory (ROM) coupled to the system bus. The ROM may include a built-in operating system (BIOS), which controls certain basic functions of computer.

The controller 50 may include an input/output (I/O) adapter and a communications adapter coupled to the system bus. The I/O adapter generally provides for communicating with a hard disk and/or long term storage unit (such as a tape drive, a solid state drive (SSD)) or any other similar component (such as an optical drive).

The communications adapter interconnects system bus with an outside network enabling controller 50 to communicate with other such systems. The communications adapter may be supportive of at least one of wired and wireless communication protocols, and may communicate (directly or indirectly) with the Internet.

The controller 50 is powered by a suitable power supply. Input/output devices are provided via user interface (UI) adapter. A keyboard, a pointing device (e.g., a mouse), and speaker may be included and interconnected to controller 50 via user interface adapter. Other user interface components may be included as deemed appropriate.

Generally, the controller 50 stores machine readable instructions on non-transitory machine readable media (such as in ROM, RAM, or in a mass storage unit). The machine readable instructions (which may be referred to herein as "software," as an "application," as a "client, a "process," a "plug-in" and by other similar terms) generally provide for functionality as will be discussed in detail further herein.

Some of the machine readable instructions stored on non-transitory machine readable media may include an operating environment. For example, and as presented herein, a suitable operating environment is WINDOWS (available from Microsoft Corporation of Redmond Wash.). Software as provided herein may be developed in, for example, SQL language, which is a cross-vendor query language for managing relational databases. Aspects of the software may be implemented with other software. For example, user interfaces may be provided in XML, HTML and the like.

It should be recognized that some functionality as may be described herein may be implemented by hardware (such as by drive 104), or by software, as appropriate. Accordingly, where reference is made to implementation in one manner or another, such implementation is merely illustrative and is not limiting of techniques described. Operation of the controller 50 may be combined with or enhanced by other technology such as machine vision.

A technical effect of implementation of the controller 50 is that improved mechanical, thermal, electrical and reliability profile relative to presently available devices is made possible. In particular, there is provided enhanced convective and conductive heat transfer inside the robot joint. The controller 50 may be configured to control the joint 100 according to any one or more such aspect and may do so in a manner to balance production against maintenance, longevity and other such concerns.

Various other components may be included and called upon for providing for aspects of the teachings herein. For example, additional materials, combinations of materials and/or omission of materials may be used to provide for added embodiments that are within the scope of the teachings herein.

A variety of modifications of the teachings herein may be realized. Generally, modifications may be designed according to the needs of a user, designer, manufacturer or other similarly interested party. The modifications may be intended to meet a particular standard of performance considered important by that party. Embodiments disclosed are not to be construed as limiting of the technology, but merely as illustrative.

When introducing elements of the present invention or the embodiment(s) thereof, the articles "a," "an," and "the" are intended to mean that there are one or more of the elements. Similarly, the adjective "another," when used to introduce an element, is intended to mean one or more elements. The terms "including" and "having" are intended to be inclusive such that there may be additional elements other than the listed elements. As used herein, the term "exemplary" is not intended to imply a superlative example. Rather, "exemplary" refers to an embodiment that is one example of many possible examples for embodiments.

While the invention has been described with reference to exemplary embodiments, it will be understood by those skilled in the art that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A rotary mechanical joint configured for providing dissipation of heat generated therein, the rotary mechanical joint comprising:
    a housing containing a motor assembly configured to drive a gear assembly for driving the rotary mechanical joint, the motor assembly configured to be controlled by a control assembly for controlling rotation of a rotor of the motor assembly;
    a brake disk comprising at least one of dents, bumps and punched slots which are configured to increase air flow within the housing by generating air cooling flows inside the motor assembly,
    wherein a plunger pin, comprising a brake spring therein, is configured to cooperate with at least one of the dents, bumps, and punched slots on the brake disk to constrain rotation;
    wherein at least one of a solenoid of the control assembly and a stator of the motor assembly is potted with material selected to conduct heat away therefrom; and
    wherein an encoder disk configured for monitoring rotation is combined with the brake disk to form a singular component.

2. The rotary mechanical joint of claim 1, including a magnetic read head, wherein a distance between the magnetic read head and the encoder disk is adjustable.

3. The rotary mechanical joint of claim 1, wherein a solenoid of the control assembly is mounted within a pocket of the housing.

4. The rotary mechanical joint of claim 1, wherein a solenoid of the control assembly is mounted proximate to a thruway of the housing.

5. The rotary mechanical joint of claim 1, wherein at least one of a rear cover, mid-cover, the brake disk, at least a portion of the gear assembly and the housing is fabricated from aluminum, an alloy thereof or another material exhibiting high thermal conductivity and lightweight characteristics.

6. The rotary mechanical joint of claim 1, wherein said plunger pin is configured to engage at least one of the punched slots, dents, and bumps of the brake disk.

7. The rotary mechanical joint of claim 1, further comprising at least one sensor configured for monitoring a performance parameter disposed therein.

8. The rotary mechanical joint of claim 7, wherein the performance parameter comprises at least one of temperature, stress, strain, load, position, rotation, and acceleration.

9. The rotary mechanical joint of claim 7, wherein a shaft of the motor is fabricated from a material selected to reduce heat transfer from the motor into the gear assembly.

10. A robot comprising:
    at least one rotary mechanical joint configured for providing dissipation of heat generated therein, the at least one rotary mechanical joint comprising:
        a housing containing a motor assembly configured to drive a gear assembly for driving the rotary mechanical joint, the motor assembly configured to be controlled by a control assembly for controlling rotation of a rotor of the motor assembly;
    a brake disk comprising at least one of dents, bumps and punched slots which are configured to increase air flow within the housing by generating air cooling flows inside the motor assembly,
    wherein a plunger pin, comprising a brake spring therein, is configured to cooperate with at least one of the dents, bumps, and punched slots on the brake disk to constrain rotation,
    wherein at least one of a solenoid of the control assembly and a stator of the motor assembly is potted with material selected to conduct heat away therefrom;
    wherein an encoder disk configured for monitoring rotation is combined with the brake disk to form a singular component; and
    a tool configured for performing a task.

11. The robot as in claim 10, wherein the robot is a multi-axis robot.

12. The robot as in claim 10, wherein the task comprises at least one of grasping, lifting, locating, placing of goods, painting, welding, soldering, disassembly, assembly, picking, planting, pruning, cutting, and harvesting.

13. A robotic system comprising:
- a robot comprising at least one rotary mechanical joint configured for providing dissipation of heat generated therein, and comprising:
  - a housing containing a motor assembly configured to drive a gear assembly for driving the rotary mechanical joint, the motor assembly configured to be controlled by a control assembly for controlling rotation of a rotor of the motor assembly;
  - a brake disk comprising at least one of dents, bumps and punched slots which are configured to increase air flow within the housing by generating air cooling flows inside the motor assembly,
  - wherein a plunger pin, comprising a brake spring therein, is configured to cooperate with at least one of the dents, bumps, and punched slots on the brake disk to constrain rotation,
  - wherein at least one of a solenoid of the control assembly and a stator of the motor assembly is potted with material selected to conduct heat away therefrom;
  - wherein an encoder disk configured for monitoring rotation is combined with the brake disk to form a singular component; and
- a controller for controlling the robot.

14. The robotic system as in claim 13, wherein the controller comprises machine readable instructions stored on non-transitory media and that are machine executable, the instructions for controlling the robot to perform the task.

15. The robotic system as in claim 13, wherein the controller comprises machine readable instructions stored on non-transitory media and that are machine executable, the instructions for controlling the robot to control at least one of the motor assembly and the control assembly.

16. The robotic system as in claim 15, wherein the controlling results from data received from sensors within the rotary mechanical joint.

17. The robotic system as in claim 16, wherein the sensors comprise sensors configured for monitoring at least one of temperature, stress, strain, load, position, rotation, and acceleration.

* * * * *